(12) United States Patent
Medhat et al.

(10) Patent No.: US 8,736,843 B2
(45) Date of Patent: May 27, 2014

(54) OPTO-MECHANICAL OPTICAL PATH RETARDATION MULTIPLIER FOR OPTICAL MEMS APPLICATIONS

(75) Inventors: Mostafa Medhat, Heliopolis Cairo (EG); Bassam A. Saadany, Nasr (EG); Diaa A. M. Khalil, First Zone (EG); Bassem Mortada, Nasr (EG)

(73) Assignee: Si-Ware Systems, Cairo (EG)

( * ) Notice: Subject to any disclaimer, the term of this patent is extended or adjusted under 35 U.S.C. 154(b) by 528 days.

(21) Appl. No.: 12/762,068

(22) Filed: Apr. 16, 2010

(65) Prior Publication Data

US 2010/0265512 A1    Oct. 21, 2010

Related U.S. Application Data

(60) Provisional application No. 61/170,536, filed on Apr. 17, 2009.

(51) Int. Cl.
G01J 3/45 (2006.01)
(52) U.S. Cl.
USPC .......................................... 356/451
(58) Field of Classification Search
USPC .......................................... 356/451
See application file for complete search history.

(56) References Cited

U.S. PATENT DOCUMENTS

| 2,966,090 | A | | 12/1960 | Scholdstrom |
| 3,434,787 | A | * | 3/1969 | Chitayat ............... 356/493 |
| 4,973,160 | A | | 11/1990 | Takiguchi |
| 7,342,664 | B1 | | 3/2008 | Radziszewski |
| 2003/0227681 | A1 | | 12/2003 | Currie |

FOREIGN PATENT DOCUMENTS

| DE | 102006002460 A1 | 7/2007 |
| EP | 1099972 A2 | 5/2001 |
| JP | 59198417 A | 11/1984 |
| WO | 03054595 A1 | 7/2003 |

OTHER PUBLICATIONS

S. D. Collins, R. L. Smith, C. Gonzalez, K. P. Steward, J. G. Hagopian and J. M. Sirota, "Fourier-Transform Optical Microsystems," Optics Letters, vol. 24, No. 12, pp. 844-846, Jun. 15, 1999.

O. Manzardo, H. P. Herzig, C. R. Marxer and N. F. de Root, "Miniaturized Time-Scanning Fourier Transform Spectrometer Based on Silicon Technology," Optics Letters, vol. 24, No. 23, pp. 1705-1707, Dec. 1, 1999.

(Continued)

Primary Examiner — Tarifur Chowdhury
Assistant Examiner — Jonathon Cook
(74) Attorney, Agent, or Firm — Garlick & Markison; Holly L. Rudnick

(57) ABSTRACT

An optical Micro Electro-Mechanical System (MEMS) device provides an optical path retardation multiplier. The MEMS device includes a moveable corner cube reflector, a fixed minor and a MEMS actuator. The moveable corner cube reflector is optically coupled to receive an incident beam and reflect the incident beam through 180 degrees towards the fixed mirror. The fixed minor is optically coupled to reflect a reflected beam back towards the moveable corner cube reflector along a reverse path of the incident beam. The MEMS actuator is coupled to the moveable corner cube reflector to cause a displacement of the moveable corner cube reflector to extend an optical path length of the reflected beam.

20 Claims, 13 Drawing Sheets

(56) References Cited

OTHER PUBLICATIONS

P. Krippner, J. Mohr, C. Muller, C. Van der Sel, "Microspectrometer for the Infrared Range," Proc. SPIE, vol. 2783 / 277, 1996.

P. Krippner, T. Kuhner, J. Mohr and V. Saile, Microspectrometer System for the Near Infrared Wavelength Range based on the LIGA Technology, Proc. SPIE vol. 3912, 2000.

C. Solf, J. Mohr and U. Wallrabe, "Miniaturized LIGA Fourier Transformation Spectrometer,", Sensors 2003, Proceedings of IEEE 2, pp. 773-776, 2003.

D. Knipp, H. Stiebig, S. R. Bhalotra, H. L. Kung and D. A. B. Miller, "Thin Film Technology Based Micro-Fourier Spectrometer," MOEMS and Miniaturized Systems III, Proc. SPIE 4983, pp. 127-138, Jan. 2003.

D. Knipp, H. Stiebig, S. H. Bhalotra, E. Bunte, H. L. Kung and D. A. B. Miller, "Silicon-Based Micro-Fourier Spectrometer," IEEE Transactions on Electron Devices, vol. 52, No. 3, pp. 419-426, Mar. 2005.

O. Manzardo, R. Michaely, F. Schadelin, W. Noell, T. Overstolz, N. de Root, and H. P. Herzig, "Miniature Lamellar Grating Interferometer Based on Silicon Technology," Optics Letters, vol. 29, No. 13, pp. 1437-1439, Jul. 1, 2004.

K. Yu, D. Lee, U. Krishnamoorthy, N. Park and O. Solgaard, "Micromachined Fourier Transform Spectrometer on Silicon Optical Bench Platform," Sensors and Actuators A 130-131, pp. 523-530, Jan. 20, 2006.

K. Yu, N. Park, D. Lee and O. Solgaard, "Chip-Scale High-Speed Fourier-Transform Spectrometer Based on a Combination of a Michelson and a Fabry-Perot Interferometer," IEEE Sensors 2006, EXCO, pp. 412-415, Oct. 22-25, 2006.

E. R. Schildkraut, D. Reyes, D. J. Cavicchio and J. O. Jensen, "A MEMS Based Absorption Micro-Spectrometer for Toxic Vapor Detection and Identification", presented at the Scientific Conference on Chemical and Biological Defense Research 2004, Hunt Valley, Maryland, pp. 1-8, Nov. 15-17, 2004.

M. S. Baker, R. A. Plass, T. J. Headley and J. A. Walraven, "Final Report: Compliant Thermo-Mechanical MEMS Actuators LDRD #52553," Sandia report SAND2004-6635, pp. 1-38, Dec. 2004.

D. Reyes, E. R. Schildkraut, J. Kim, R. F. Connors, P. Kotidis and D. J. Cavicchio, "A Novel Method of Creating a Surface Micromachined 3-D Optical Assembly for MEMS-Based, Miniaturized FTIR Spectrometers," Proc. of SPIE, vol. 6888, 68880D, pp. 1-8, 2008.

L. Zhou, J. M. Kahn and K. S. J. Pister, "Corner-Cube Retroreflectors Based on Structure-Assisted Assembly for Free-Space Optical Communication," IEEE, Journal of Microelectromechanical Systems, vol. 12, No. 3, pp. 233-242, Jun. 2003.

B. A. Warneke, M. D. Scott, B. S. Leibowitz, L. Zhou, C. L. Bellew, J. A. Chediak, J. M. Kahn, B. E. Boser and K. S. J. Pister, "An Autonomous 16 mm3 Solar-Powered Node for Distributed Wireless Sensor Networks", Proc. Sensor 2002, Orlando, FL, 12-14 2002.

International Search Report and Written Opinion for PCT/US2010/031467 mailed Jul. 16, 2010, 13 pages.

\* cited by examiner

OPTO-MECHANICAL OPTICAL PATH RETARDATION MULTIPLIER FOR OPTICAL MEMS APPLICATIONS

CROSS REFERENCE TO RELATED PATENTS

This U.S. application for patent claims the benefit of the filing date of U.S. Provisional Patent Application entitled, Opto-Mechanical Optical Path Retardation Multiplier for Optical MEMS Applications, having Ser. No. 61/170,536, filed on Apr. 17, 2009, which is incorporated herein by reference for all purposes.

BACKGROUND OF THE INVENTION

1. Technical Field of the Invention

The present invention relates in general to optical MEMS, and in particular, to optical path retardation multiplier devices using MEMS technology.

2. Description of Related Art

Micro Electro-Mechanical Systems (MEMS) refers to the integration of mechanical elements, sensors, actuators and electronics on a common silicon substrate through microfabrication technology. For example, the microelectronics are typically fabricated using an integrated circuit (IC) process, while the micromechanical components are fabricated using compatible micromachining processes that selectively etch away parts of the silicon wafer or add new structural layers to form the mechanical and electromechanical components. MEMS devices are attractive candidates for use in spectroscopy, profilometry, environmental sensing, refractive index measurements (or material recognition), as well as several other sensor applications, due to their low cost, batch processing ability and compatibility with standard microelectronics. In addition, the small size of MEMS devices enables the integration of equipment incorporating MEMS devices into mobile and hand held devices.

Recently, MEMS devices have been utilized in a number of optical applications that require large optical displacement by transforming a mechanical distance into an equivalent much larger optical distance. For example, MEMS technology can provide adequate resolution in many Fourier Transform spectrometers and Michelson interferometers. As another example, MEMS devices can produce sufficient scanning depths in various Optical Coherence Tomography (OCT) applications. In addition, MEMS devices can also be used to achieve dynamic optical focusing through the manipulation of the optical beam working distance by a moving MEMS mirror.

In the area of spectrometry in particular, silicon-MEMS Fourier-transform spectrometers have been introduced that achieve a resolution of about 50 nm around 1500 nm in the NIR (220 cm$^{-1}$). In addition, MEMS-based Fourier transform-IR spectrometers for use in the 2-13.5 µm spectral range have also been proposed. The resolution targeted for such an IR spectrometer is 10 cm$^{-1}$, which requires a minor motion on the order of 0.5 mm. However, even higher resolutions are needed in future MEMS based Fourier transform spectrometers. In order to achieve these higher resolutions, the optical path difference or optical path retardation must be increased. Unfortunately, such an increase is not compatible with the small mechanical displacements in existing compact size MEMS devices.

Therefore, what is needed is an optical MEMS device that allows obtaining a much longer optical path difference for a given mechanical displacement.

SUMMARY OF THE INVENTION

Embodiments of the present invention provide an optical Micro Electro-Mechanical System (MEMS) device providing an optical path retardation multiplier. The MEMS device includes a moveable corner cube reflector, a fixed mirror and a MEMS actuator. The moveable corner cube reflector is optically coupled to receive an incident beam on one edge of the corner cube reflector and operable to reflect the incident beam from another edge of the corner cube reflector. The fixed mirror is optically coupled to receive the incident beam reflected from the moveable corner cube reflector and operable to reflect the incident beam back towards the moveable corner cube reflector as a reflected beam along a reverse path of the incident beam. The MEMS actuator is coupled to the moveable corner cube reflector to cause a displacement of the moveable corner cube reflector perpendicular to a plane of the fixed mirror to extend an optical path length of the reflected beam.

In an exemplary embodiment, the optical path difference between a first position of the moveable corner cube reflector and a second position of the moveable corner cube reflector is four times a displacement of the moveable corner cube reflector between the first position and the second position.

In a further embodiment, the moveable corner cube reflector includes a moveable array of corner cube reflectors and the fixed minor includes an array of fixed minors offset from the moveable array of corner cube reflectors such that the reflected beam is parallel to the incident beam. In addition, each fixed mirror in the array of fixed minors can be a corner cube reflector coupled to receive the incident beam on one edge thereof from a first corresponding corner cube reflector in the moveable array of corner cube reflectors and to reflect the reflected beam on another edge thereof towards a second corresponding corner cube reflector in the moveable array of corner cube reflectors. Furthermore, a flat mirror can be coupled to an end of the moveable array of corner cube reflectors and optically coupled to receive the incident beam from a last one of the corner cube reflectors in the array of fixed minors and to reflect the reflected beam back towards the last one of the corner cube reflectors in the array of fixed minors to direct the reflected beam along the reverse path.

In this embodiment, an optical path difference between a first position of the moveable array of corner cube reflectors and a second position of the moveable array corner cube reflector is equal to a displacement of the moveable array of corner cube reflectors between the first position and the second position multiplied by a sum of four times a number of corner cube reflectors in the moveable array of corner cube reflectors plus two.

In still a further another embodiment, the optical MEMS device further includes a first small corner cube mirror coupled between the moveable array of corner cube reflectors and the flat mirror and a second small corner cube mirror coupled to the array of fixed minors on an end thereof that is opposite to the end of the moveable array of corner cube reflectors to which the flat mirror is coupled. The dimensions of each of the first and second small corner cube minors are smaller than the dimensions of each corner cube reflector within the moveable and fixed arrays of corner cube reflectors. In this embodiment, an optical path difference between a first position of the moveable array of corner cube reflectors and a second position of the moveable array corner cube reflector is increased by a factor equal to a number of circulations the incident beam travels through the moveable array of corner cube reflectors and the array of fixed minors, in which the number of circulations is based on the dimensions of the first and second small corner cube mirrors and a spot size of the incident beam.

Embodiments of the present invention further provide a Michelson interferometer fabricated as a Micro Electro-Mechanical System (MEMS) structure providing an optical path retardation multiplier. The interferometer includes first and second arrays of fixed mirrors, a moveable array of corner cube reflectors moveable in an area between the first and second arrays of fixed mirrors in a direction orthogonal to a plane of the first and second arrays of fixed mirrors, a detector, a beam splitter and an auxiliary mirror.

The beam splitter is optically coupled to receive an incident beam and to split the incident beam into a first incident beam and a second incident beam. The first incident beam is directed towards an initial corner cube reflector of the moveable array of corner cube reflectors to be reflected between a first side of the moveable array of corner cube reflectors and the first array of fixed mirrors along a first forward and reverse path and output as a first reflected beam from the initial corner cube reflector of the moveable array of corner cube reflectors back towards the beam splitter.

The auxiliary mirror is optically coupled to receive the second incident beam and to reflect the second incident beam towards an initial fixed mirror in the second array of fixed mirrors to be reflected between the second fixed array mirrors and a second side of the moveable array of corner cube reflectors along a second forward and reverse path and output as a second reflected beam from the initial fixed mirror of the second array of fixed mirrors. The auxiliary mirror is further optically coupled to receive the second reflected beam and reflect the second reflected beam towards the beam splitter. The beam splitter is further optically coupled to combine the first reflected beam and the second reflected beam to produce a combined beam that is directed towards the detector.

In this embodiment, an optical path difference between a first position of the moveable array of corner cube reflectors and a second position of the moveable array corner cube reflector is equal to a displacement of the moveable array of corner cube reflectors between the first position and the second position multiplied by twice a sum of four times a number of corner cube reflectors in the moveable array of corner cube reflectors plus two.

Embodiments of the present invention further provide a method for fabricating an optical Micro Electro-Mechanical System (MEMS) device providing an optical path retardation multiplier. The method includes providing a silicon on insulator (SOI) wafer including a top surface and a bottom surface and photolithographically defining within the top surface of the SOI wafer a moveable corner cube reflector optically coupled to receive an incident beam on one edge of the corner cube reflector and operable to reflect the incident beam from another edge of the corner cube reflector, a fixed mirror optically coupled to receive the incident beam from the moveable corner cube reflector and operable to reflect the incident beam back towards the moveable corner cube reflector as a reflected beam along a reverse path of the incident beam and a MEMS actuator coupled to the moveable corner cube reflector to cause a displacement of the moveable corner cube reflector perpendicular to a plane of the fixed mirror to extend an optical path length of the reflected beam. The method further includes etching between the top surface of the SOI wafer and the bottom surface of the SOI wafer using a deep reactive ion etching process to form the fixed mirror and the MEMS actuator and etching between the top surface of the SOI wafer and the bottom surface of the SOI wafer using an anisotropic alkaline wet etching process to form the moveable corner cube reflector.

BRIEF DESCRIPTION OF THE DRAWINGS

A more complete understanding of the present invention may be obtained by reference to the following detailed description when taken in conjunction with the accompanying drawings wherein.

DETAILED DESCRIPTION OF THE DRAWINGS

An optical MEMS device in accordance with embodiments of the present invention realizes a large optical path retardation (optical path difference) for only a small mechanical displacement of a MEMS moving mirror. The MEMS moving mirror includes a corner cube reflector arranged in a manner to realize the extended optical path difference required. The optical MEMS device can be used to extend the range of resolution achieved by MEMS FTIR spectrometers an order of magnitude higher than existing solutions, enabling them to compete with high resolution traditional lab instrument spectrometers. The optical MEMS device can be also used to increase the scanning depth measurement range in Optical Coherence Tomography (OCT) applications. In addition, the optical MEMS device may also be used other MEMS applications that require large optical path distances achieved by small physical displacements.

Figures 1A, 1B:
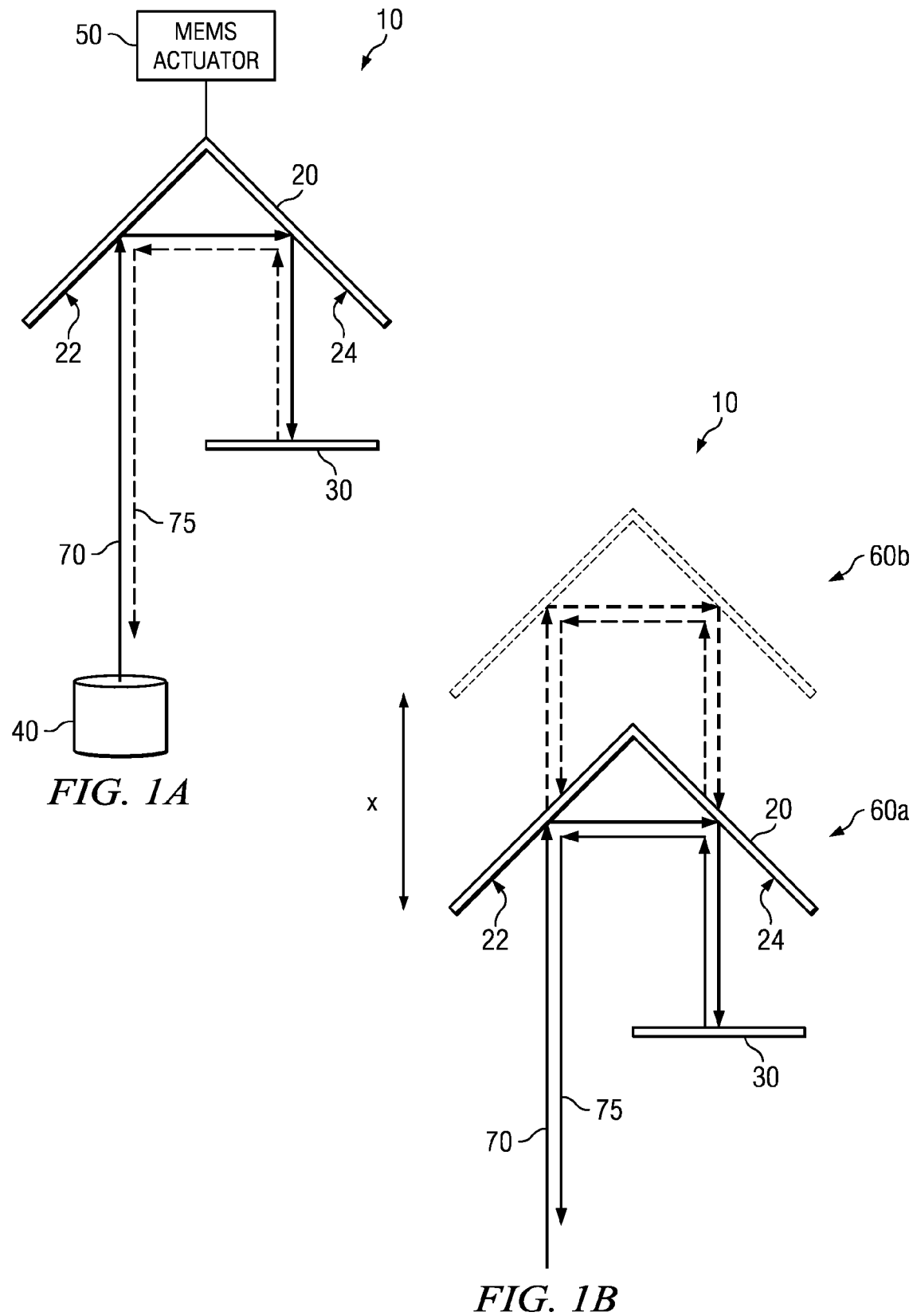
FIG. 1A is a diagram illustrating an exemplary optical MEMS device providing optical path retardation multiplication, in accordance with embodiments of the present invention.
FIG. 1B is a diagram illustrating exemplary motion of the optical MEMS device, in accordance with embodiments of the present invention.

Turning now to FIG. 1A, there is illustrated an exemplary optical Micro Electro-Mechanical System (MEMS) device in accordance with embodiments of the present invention. The optical MEMS device 10 can be fabricated using, for example, conventional MEMS technology with one lithography step and classical metallization, as described in more detail below in connection with FIGS. 7-9.

The optical MEMS device 10 includes a moveable reflector 20, a fixed minor 30, a light source 40 and a MEMS actuator 50. The light source 40 may be, for example, a laser source, a collimated LED, an optical fiber, or any other type of optical source. The light source 40 may produce visible, Infra Red (IR), Ultra Violet (UV), X-ray or Microwave radiation. The MEMS actuator 50 may be an electrostatic comb-drive actuator or other type of MEMS actuator. The moveable reflector 20 shown in FIG. 1A is a corner cube reflector that includes two mirrors placed at right angles to one another such that a beam incident from any direction in the plane perpendicular to both minors is reflected through 180 degrees. However, in other embodiments, the moveable reflector 20 may include two minors placed at different angles with respect to one another, as described in more detail below in connection with FIGS. 6A and 6B.

The moveable reflector 20 is optically coupled to receive an incident beam 70 from the light source 40 and to reflect the incident beam 70 through 180 degrees. More specifically, the moveable reflector 20 receives the incident beam 70 on one edge 22 of the corner cube reflector 20 and reflects the incident beam from another edge 24 of the corner cube reflector 20 towards the fixed minor 30, which is shown in FIG. 1 as a flat mirror oriented orthogonal to a direction of the incident beam 70. The fixed mirror 30 reflects the incident beam back to the moveable reflector 20 as a reflected beam 75 that propagates along a reverse path of the incident beam 70. The MEMS actuator 50 causes a displacement of the moveable reflector 20 perpendicular to a plane of the fixed minor 30 to extend an optical path length of the reflected beam 75.

For example, as shown in FIG. 1B, as the corner cube reflector 20 is mechanically displaced a distance x parallel to the direction of the incident beam 70, the optical path difference between the two light paths (i.e., when the corner cube reflector is in an initial position 60a and when the corner cube reflector is in another position 60b) is 4x, where x is the mechanical displacement of the corner cube reflector 20. Thus, utilizing a single cube corner reflector 20 produces an optical path difference twice that of a conventional flat mirror normally used in MEMS devices.

Figure 1C:
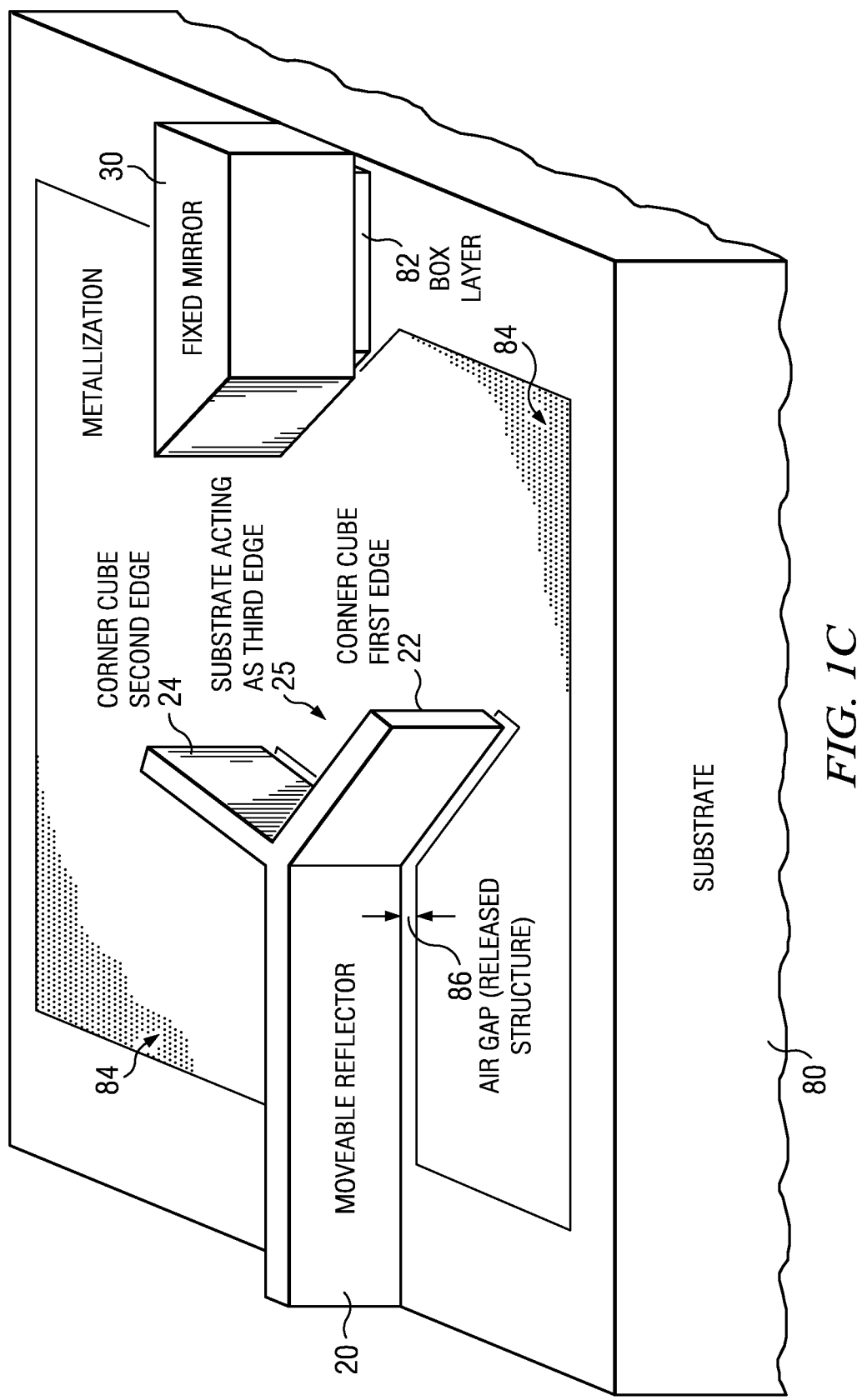
FIG. 1C is a perspective view of an exemplary optical MEMS device, in accordance with embodiments of the present invention.

A perspective view of an exemplary optical MEMS device incorporating the optical path retardation multiplier is shown in FIG. 1C. As can be seen in FIG. 1C, the moveable reflector 20 and fixed minor 30 are each fabricated on a substrate 80. The fixed mirror 30 overlies a buried oxide (BOX) layer 82 in the substrate 80, while an air gap 86 separates the substrate 80 from the moveable reflector 20 to enable the moveable reflector 20 to slide above the surface of the substrate 80. A metallization layer 84 covers the substrate 80, the first and second edges 22 and 24 of the moveable corner cube reflector 20 and an opposing edge of the fixed mirror 30.

To compensate for any tilt or shear angles in the incident beam and to ensure that. the reflected beam travels back parallel to the incident beam independent of the angle of the reflector, the corner cube reflector 20 in FIG. 1C can be seen to include three perpendicular edges: the two moving edges 22 and 24 and the metallized substrate 25 functioning as the third reflector edge. All three corner cube reflector edges 22, 24 and 25 are formed and metallized in one step, as described below in connection with FIGS. 7-9, but only the two moving edges 22 and 24 move together, while the substrate edge 25 remains fixed. As such, the arrayed corner cube reflector 20 can be positioned as shown, where incident light beams are parallel to the plane of the substrate 80, or the reflector 20 may be placed in a different manner to accommodate for the usage of the third edge 25 to compensate for shear and tilt.

Figure 2:
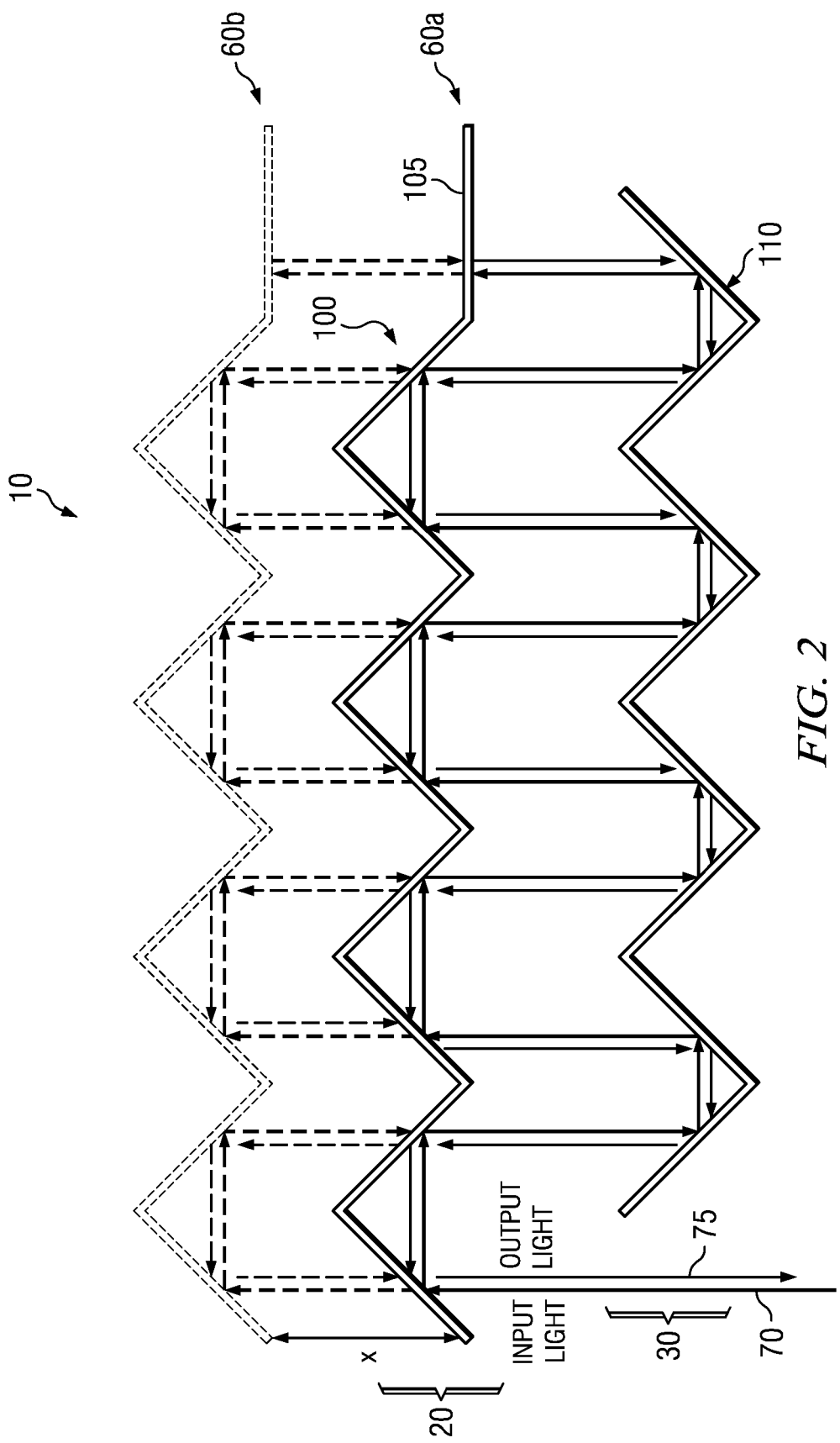
FIG. 2 is a diagram illustrating another exemplary optical MEMS device providing optical path retardation multiplication, in accordance with embodiments of the present invention.

In FIG. 2, instead of using a single corner cube reflector as the moveable reflector 20, an array of corner cube reflectors 100 is provided. In addition, instead of using a single flat minor as the fixed minor 30, an array of fixed minors 110 is provided. The array of fixed mirrors 110 is offset from the moveable array of corner cube reflectors 100, such that the reflected beam 75 is parallel to the incident beam 70. More specifically, each fixed minor in the array of fixed minors 110 is also a corner cube reflector coupled to receive the incident/reflected beam on one edge thereof from a first corner cube reflector in the moveable array of corner cube reflectors 100 and to reflect the incident/reflected beam on another edge thereof towards a second corner cube reflector adjacent to the first corner cube reflector in the moveable array of corner cube reflectors 100. Each corner cube reflector in the moveable array of corner cube reflectors 100 introduces an additional 4x optical path difference.

In addition, a flat minor 105 is coupled to an end of the moveable array of corner cube reflectors 100 and optically coupled to receive the incident beam 70 from a last one of the fixed minors in the array of fixed mirrors 110 and to reflect the reflected beam 75 back towards the last one of the fixed mirrors in the array of fixed minors 110 to direct the reflected beam along a reverse path of the incident beam 70. This adds an extra 2x to the optical path difference (OPD), or optical path retardation, due to reflection from the flat minor 105. In general, the formula for the OPD when an array of N corner cube reflectors moves a mechanical displacement x is:

$$OPD=(4N+2)x. \quad \text{(Equation 1)}$$

For example, if the travel distance (x) of the moveable array of corner cube reflectors 100 is approximately 100 µm, and there are four (4) corner cube reflectors in the array 100, the OPD between the two beams (at the first position 60a and the second position 60b) is 1.8 mm, corresponding to an optical resolution of 5.55 cm$^{-1}$.

Figure 3:
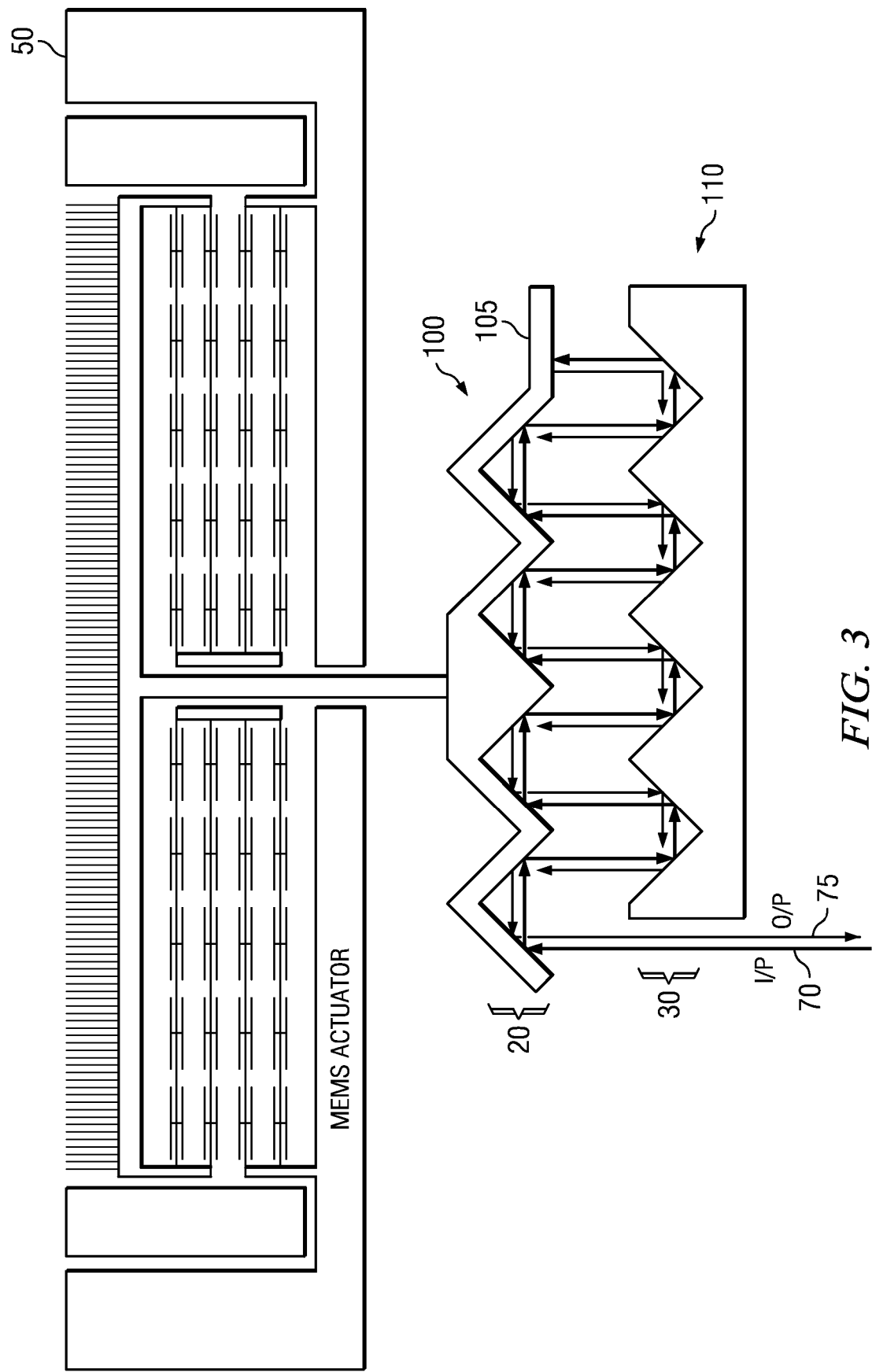
FIG. 3 is a plan view of an exemplary optical MEMS device, in accordance with embodiments of the present invention.

FIG. 3 is a plan view of an exemplary optical MEMS device, in accordance with embodiments of the present invention. In FIG. 3, the MEMS actuator 50 is an electrostatic comb-drive actuator coupled to the moveable reflector 20. The moveable reflector 20 includes an array of corner cube reflectors 100 and a fixed minor 105 coupled to the end of the array of corner cube reflectors 100. The fixed mirror 30 includes an array of fixed minors 110 (also corner cube reflectors) offset from the moveable array 100 to enable an incident beam 70 to be reflected through the arrays 100 and 110 along a forward and reverse path and exit as a reflected beam 75 from the entrance of the arrays 100 and 110. The MEMS actuator 50 causes a displacement of the entire moveable array 100 in a direction away from the incident beam 70 (i.e., parallel to the incident beam and perpendicular to the plane of the fixed array 100), which results in an increase in the optical path length of the reflected beam 75. As such, motion of the MEMS actuator 50 multiplies the optical path retardation of the reflected beam 75 by several orders of magnitude.

Figure 4:
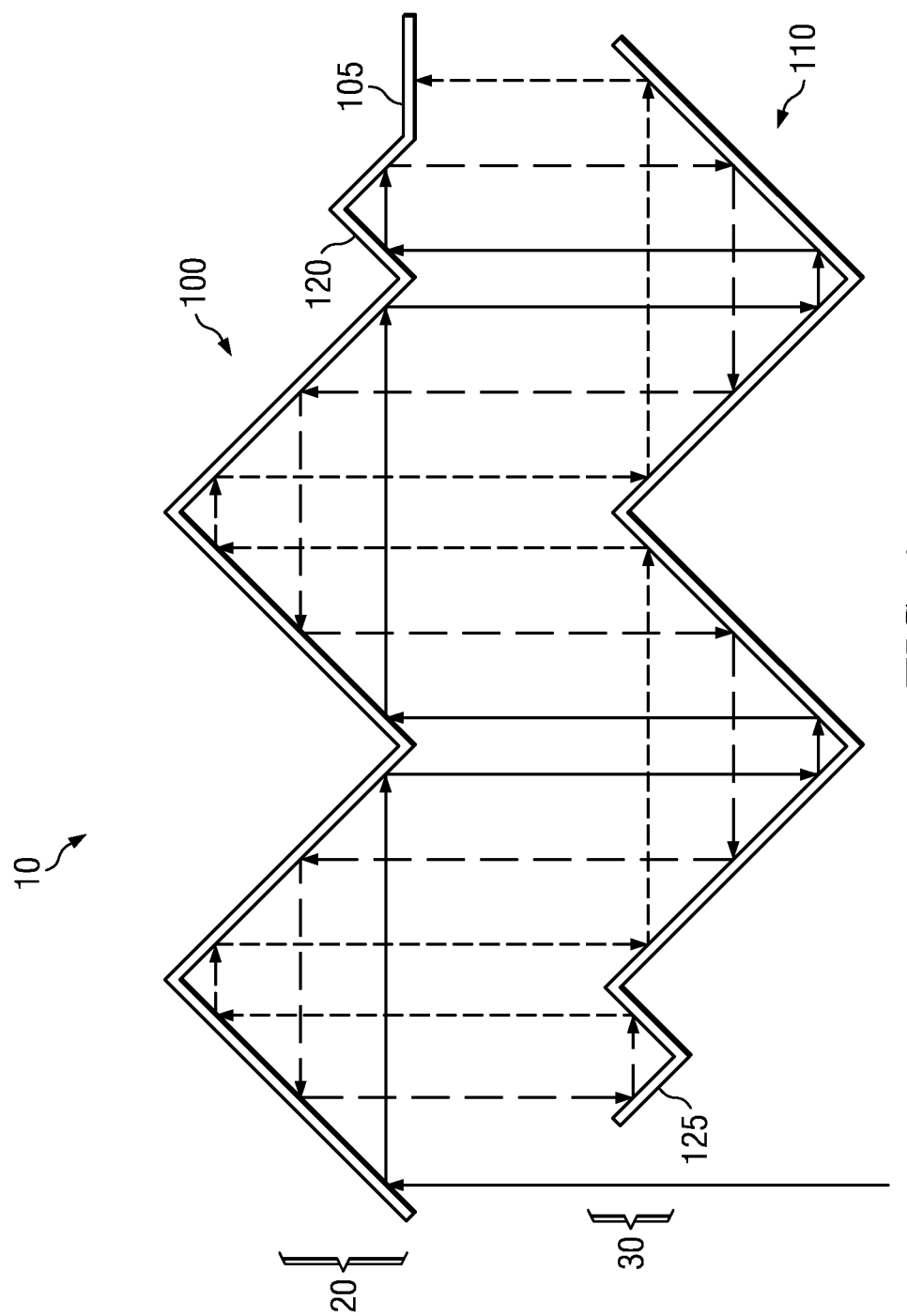
FIG. 4 is a diagram illustrating yet another exemplary optical MEMS device providing optical path retardation multiplication, in accordance with embodiments of the present invention.

Turning now to FIG. 4, another exemplary optical MEMS device providing optical path retardation multiplication by an additional order of magnitude is shown. In FIG. 4, two small corner cube mirrors 120 and 125 are added onto opposing ends of the moveable and fixed corner cube arrays 100 and 110. More specifically, the first small corner cube mirror 120 is coupled between the moveable array of corner cube reflectors 100 and the flat minor 105, while the second small corner cube minor 125 is coupled to the array of fixed mirrors 110 on an end thereof that is opposite to the end of the moveable array of corner cube reflectors 100 to which the flat mirror 105 is coupled. The dimensions (i.e., the length of each of the edges) of each of the first and second small corner cube minors 120 and 125 are smaller than respective dimensions of each corner cube reflector within the moveable array of corner cube reflectors 100 and the array of fixed minors 110.

The small corner cube reflectors 120 and 125 guide the incident beam to circulate inside the structure (i.e., between the moveable and fixed reflectors 100 and 110) until the incident beam hits the flat mirror 105, which produces the reflected beam that propagates back in the reverse path of the incident beam. As shown in FIG. 4, the incident beam propagates through three circulations before it hits the flat minor 105 and reflects back. The addition of the small corner cube reflectors 120 and 125 multiplies the optical path distance by a factor M, where M is the number of circulations the beam travels and M is determined by the dimensions of the two small corner cube reflectors 120 and 125 and the beam spot size.

Figure 5:
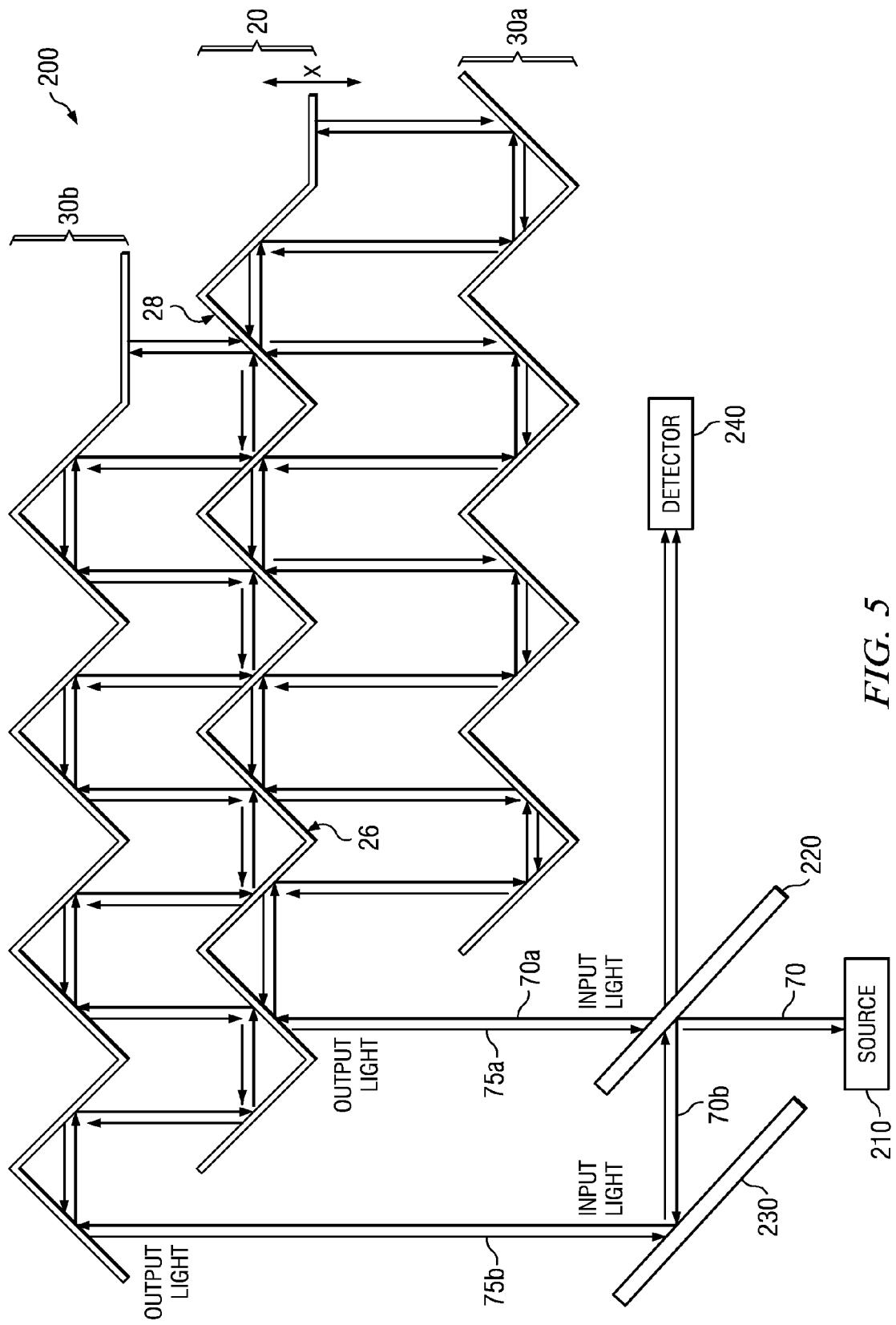
FIG. 5 is a diagram illustrating an exemplary Michelson interferometer implementing a MEMS optical path retardation multiplier, in accordance with embodiments of the present invention.

FIG. 5 is a diagram illustrating an exemplary Michelson interferometer 200 implementing a MEMS optical path retardation multiplier, in accordance with embodiments of the present invention. In FIG. 5, the two minors of the interferometer are combined into one structure having two fixed minors 30a and 30b, which are both fixed corner cube arrays and one moveable reflector 20, which is a moveable corner cube array.

The interferometer 200 is designed such that the motion of the moving minor 20 results in an increase of the optical path in one interferometer arm and a decrease of the optical path in the other interferometer arm of the same amount. For example, as the moveable reflector 20 moves away from fixed minor 30a, the optical path length between them is increased, while the optical path length between the moveable reflector 20 and fixed minor 30b is reduced. This arrangement doubles the optical path difference compared to that achieved by a single corner cube array. For example, the optical path difference (OPD) for the interferometer 200 shown in FIG. 5 can be expressed as:

$$OPD=2(4N+2)x, \quad \text{(Equation 2)}$$

which means that for the same previous example of 4 corner cube reflectors and an actuator motion of only 100 μm, the interferometer 200 achieves an optical path difference of 3.6 mm, which is equivalent to a spectrometer resolution of 2.77 cm$^{-1}$.

Turning now to the details of the interferometer 200, the Michelson interferometer includes an optical source 210, a beam splitter 220, an auxiliary minor 230, a detector 240, the moveable reflector 20 (moveable array of corner cube reflectors) and the two fixed minors 30a and 30b (arrays of fixed mirrors). In an exemplary operation, the beam splitter 220 is optically coupled to receive an incident beam 70 from the optical source 210 and to split the incident beam 70 into a first incident beam 70a and a second incident beam 70b. The first incident beam 70a is directed towards an initial corner cube reflector of the moveable array of corner cube reflectors 20 to be reflected between a first side 26 of the moveable array of corner cube reflectors 20 and the first array of fixed mirrors 30a along a first forward and reverse path and output as a first reflected beam 75a from the initial corner cube reflector of the moveable array of corner cube reflectors 20 towards the beam splitter 220.

The auxiliary minor 230 is optically coupled to receive the second incident beam 70b and to reflect the second incident beam towards an initial fixed mirror in the second array of fixed minors 30b to be reflected between the second array of fixed mirrors 30b and a second side 28 of the moveable array of corner cube reflectors 20 along a second forward and reverse path and output as a second reflected beam 75b from the initial fixed minor of the second array of fixed mirrors 30b. The auxiliary minor 230 is further optically coupled to receive the second reflected beam 75b and reflect the second reflected beam towards the beam splitter 220. The beam splitter 220 operates to split the first reflected beam 75a and second reflected beam 75b and transmit a combined first and second reflected beam towards the detector 240.

Although FIG. 5 is directed to a Michelson interferometer, it should be understood that in other embodiments, a similar structure can be provided to implement a Fourier Transform spectrometer or other type of optical device.

Figure 6A:
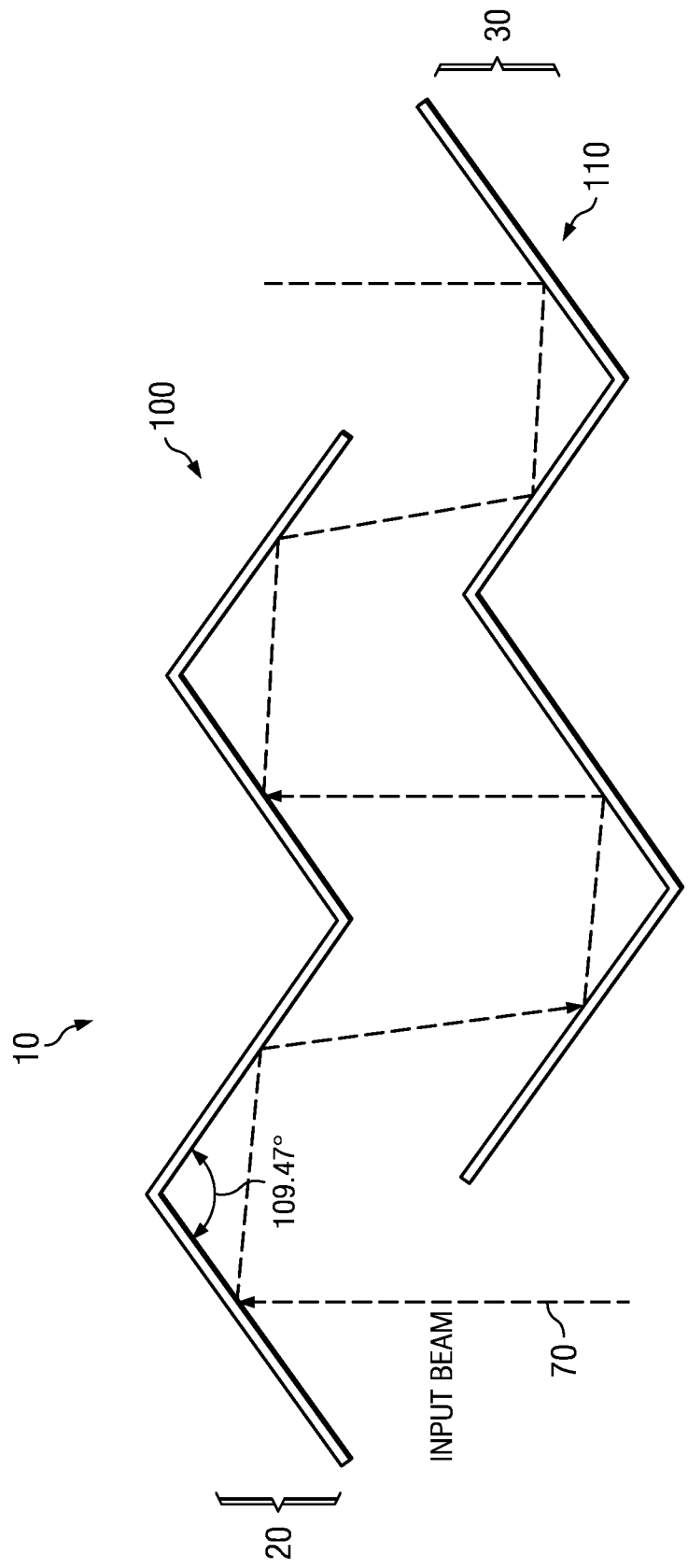
FIGS. 6A and 6B illustrate still another exemplary optical MEMS device providing optical path retardation multiplication, in accordance with embodiments of the present invention.
Figure 6B:
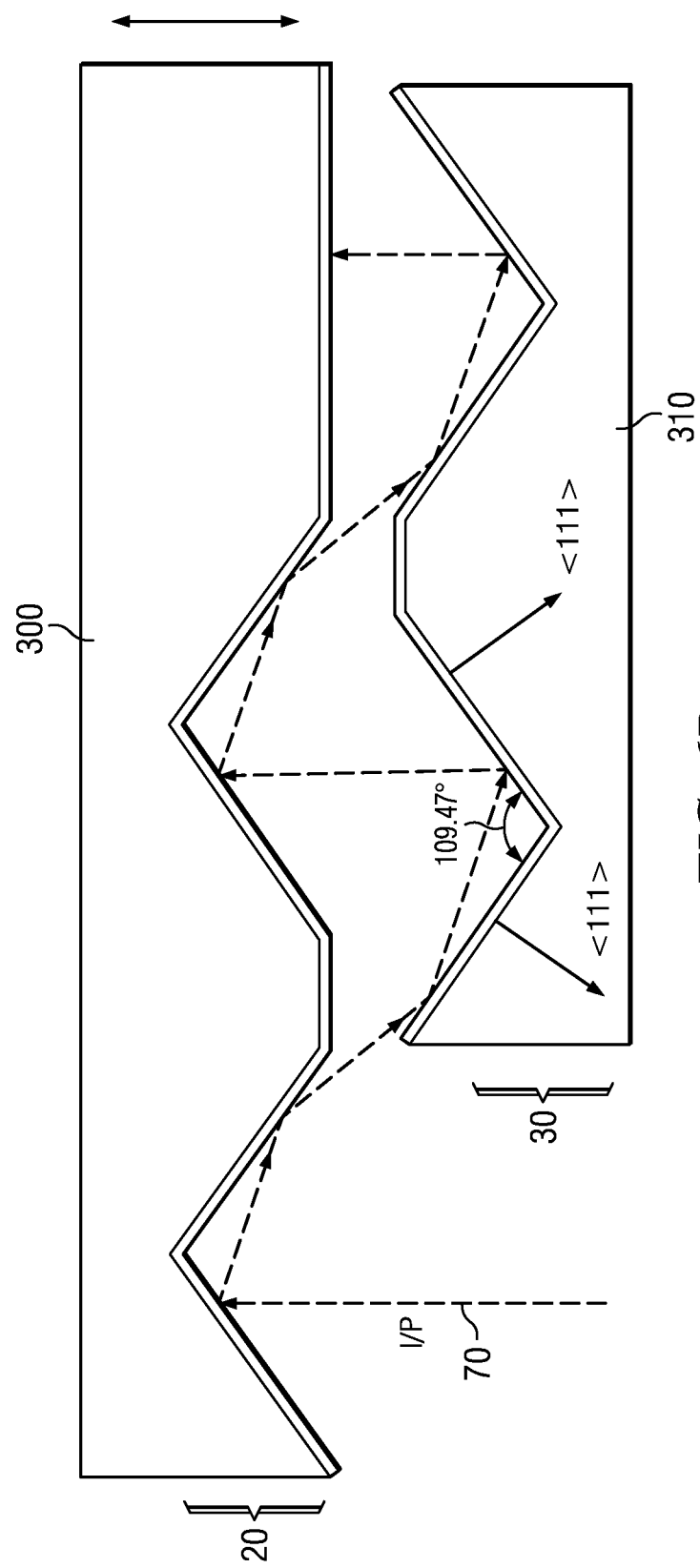

FIGS. 6A and 6B illustrate still another exemplary optical MEMS device providing optical path retardation multiplication, in accordance with embodiments of the present invention. In FIGS. 6A and 6B, the moving minor 20 and fixed minor 30 each include an array of reflectors 100 and 110, as in FIG. 2. However, the reflectors within the arrays 100 and 110 are not corner cube reflectors. Rather, the reflectors each have a non-orthogonal angle between the two edges of the reflectors. As shown in FIG. 6A, the angle is 109.47 degrees between the two edges of each reflector.

As can be seen in FIG. 6B, the reflectors can be fabricated using, for example, anisotropic alkaline wet etching of the (110) device layer 300 of the SOI wafer, as described in more detail below in connection with FIGS. 8A-8E, which enables vertical anisotropic etching as well as smooth surfaces at the <111> planes 310 of the device layer. As a result of the wet etching, the angle of the reflectors is approximately 109.47° due to the angle between the <111> vertical planes 310.

Since the reflected beam is still reflected in a path parallel to the input beam 70, after two consecutive reflection cycles from the corner cube-like minors, the moving mirror 20 and fixed minor 30 will still operate in the same manner. However, a slight modification of the formula for beam path retardation or optical path difference (OPD) is required to include the non-perpendicular path of the beam due to the <111> planes angle.

Turning now to FIGS. 7-9, there are illustrated exemplary fabrication processes for fabricating an optical MEMS device incorporating an optical path retardation multiplier, in accordance with embodiments of the present invention. FIGS. 7A-7J illustrate a first exemplary fabrication process. The first fabrication process involves the fabrication of an integrated device that includes the corner cube reflectors, fixed minors, beam splitters as well as the MEMS actuator and mechanical springs.

Figure 7A:
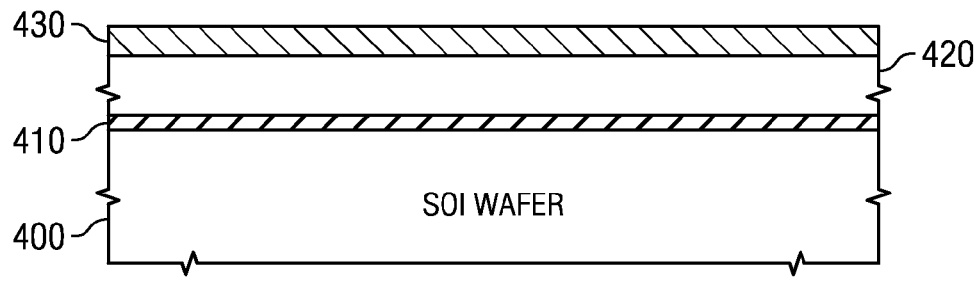
FIGS. 7A-7J illustrate exemplary fabrication process steps for a method of fabricating an optical MEMS device in accordance with embodiments of the present invention.
Figure 7B:
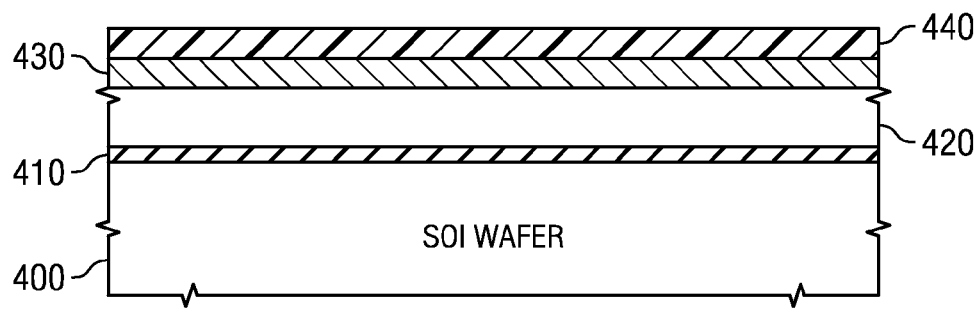
Figure 7C:
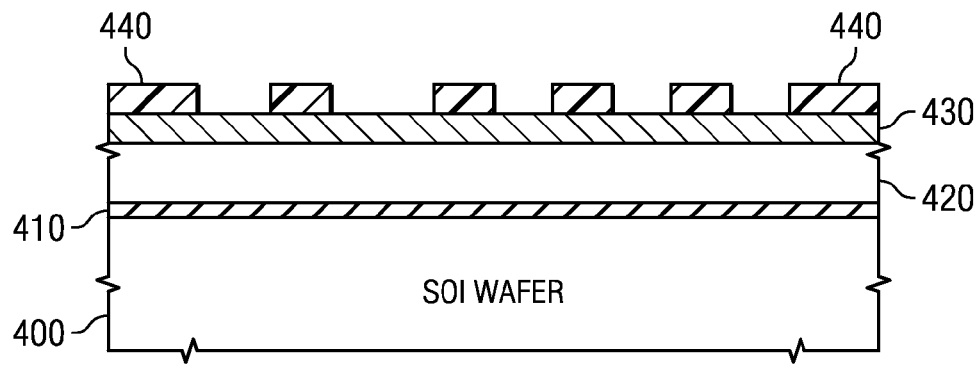
Figure 7D:
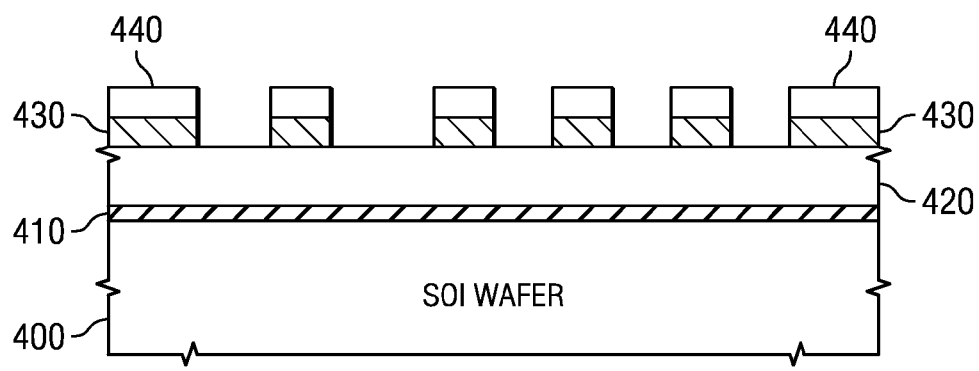
Figure 7E:
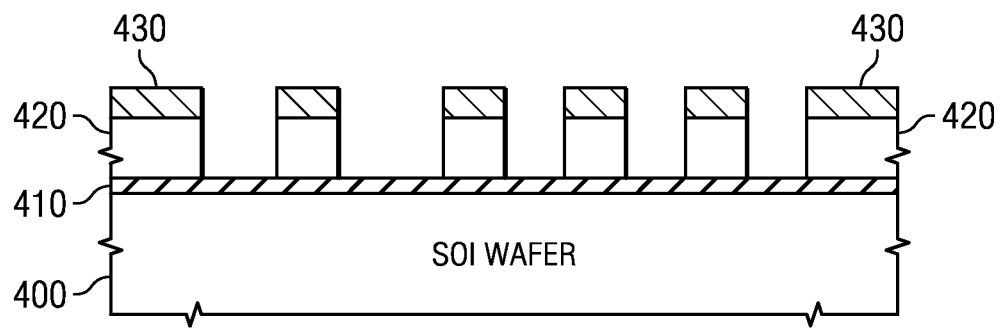
Figure 7F:
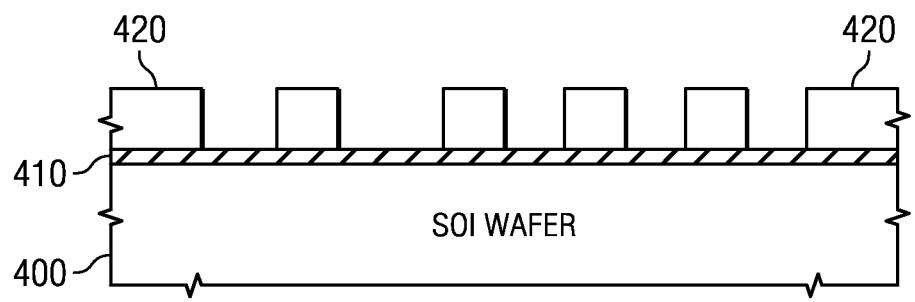

In FIG. 7A, an aluminum sputtering step is performed over an SOI wafer (layers 400-420) to form an aluminum layer 430, which functions as a mask for a subsequent etching of the top silicon layer 420 of the SOI wafer using DRIE, as shown in FIG. 7E. In FIG. 7B, a photo-resist material 440 is spun over the aluminum layer. In FIG. 7C, a lithography step is performed for realizing the MEMS device. One lithography step is sufficient for realizing the moving reflectors and fixed mirrors as well as the electrostatic actuator. The lithography pattern in the photo-resist material 440 is transferred to the aluminum mask 430 by plasma chlorine etching of the aluminum layer, as shown in FIG. 7D. DRIE is then applied to the wafer until reaching the oxide etch stop layer 410 of the SOI, as shown in FIG. 7E. Then, as shown in FIG. 7F, the remaining aluminum mask 430 is removed using an Alu etch.

Figure 7G:
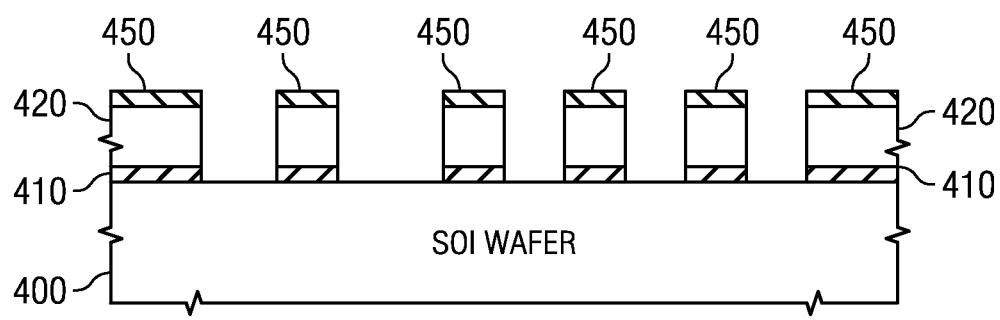
Figure 7H:
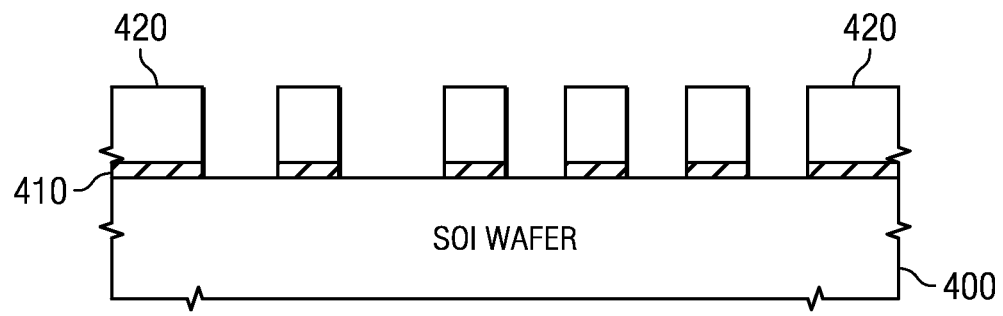
Figure 7I:
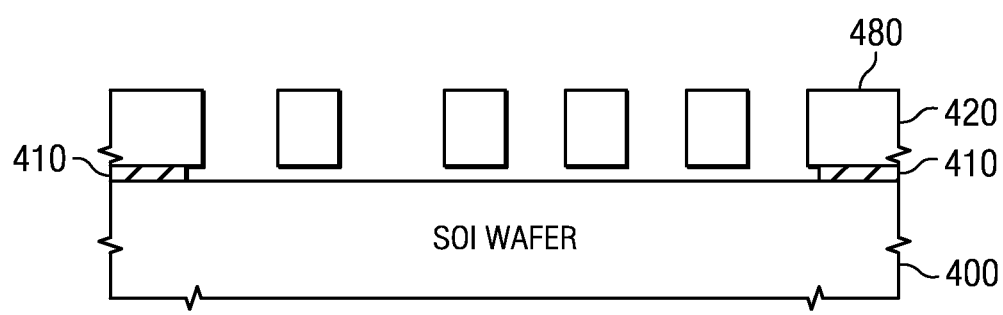

As shown in FIG. 7I, moving structures such as the MEMS actuator and moveable reflectors are released by etching the buried SiO$_2$ layer 410 using HF, while fixed structures are not released due to the wider area of the SiO$_2$ beneath.

Figure 7J:
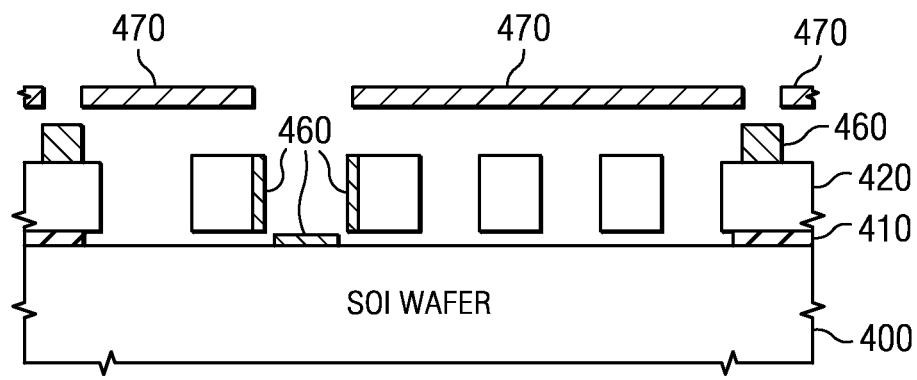

Turning now to FIG. 7J, a shadow mask 470 is used for the selective metallization 460 of the micromirrors and reflecting surfaces, as well as metallizing the substrate beneath the vertical corner cube edges to perform as the third edge of the corner cube mirror and creating connection pads. As shown in FIG. 7J, the shadow mask 470 is placed over the SOI substrate 400-420 to selectively sputter Cr/Au 460 onto desired portions of the top silicon layer 420.

In embodiments in which the Bosch process is used for DRIE etching (shown in FIG. 7E), rough mirror surfaces may result due to the periodic nature of the process. Thus, as shown in FIG. 7G, growing a thin oxide layer 450 on the surfaces and then removing it by HF, as shown in FIG. 7H, can be useful before structure release to ensure a smoother mirror surface. However, if a cryogenic DRIE process is used in FIG. 7E, the process steps shown in FIGS. 7G and 7H would be unnecessary since a smoother surface is obtained directly after etching. In addition, the aluminum mask shown in FIG. 7A may not be necessary, as the process tends to have better selectivity between a photo-resist material and silicon at cryogenic temperatures.

Figure 8A:
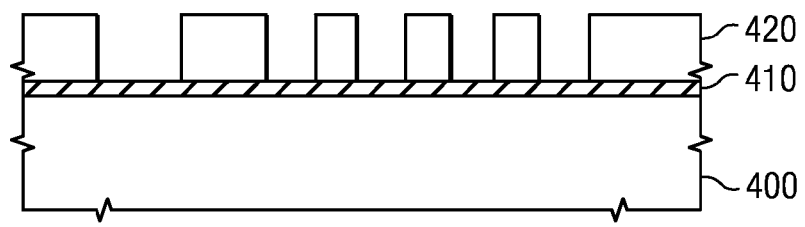
FIGS. 8A-8E illustrate exemplary fabrication process steps for another method of fabricating an optical MEMS device in accordance with embodiments of the present invention.
Figure 8B:
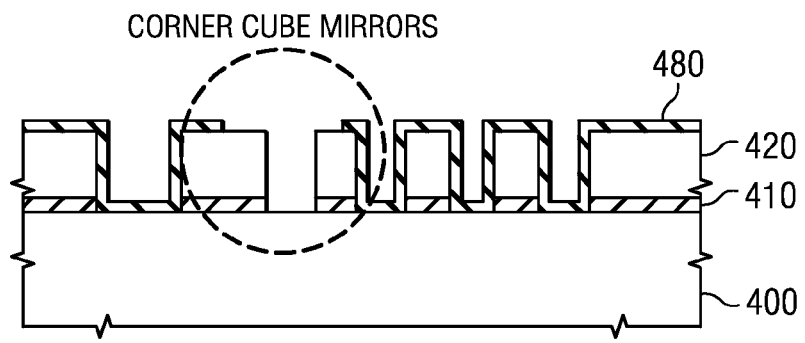
Figure 8C:
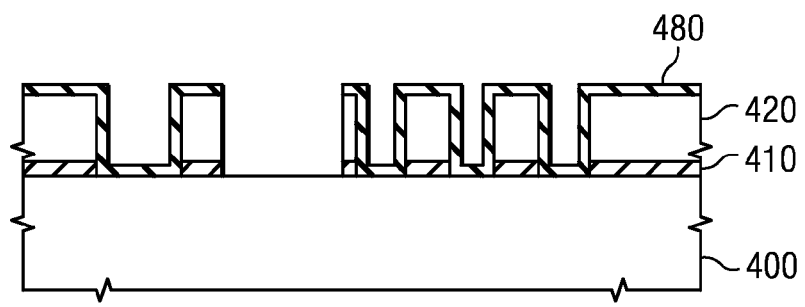

FIGS. 8A-8E illustrate exemplary fabrication process steps for another method of fabricating an optical MEMS device in accordance with embodiments of the present invention. FIG. 8A illustrates the resulting structure after a lithography step realizing the fixed mirrors as well as the electrostatic actuator of the MEMS device and DRIE etching of the top silicon layer 420 until reaching the oxide etch stop layer 410 of the SOI wafer, as similarly described above in connection with FIGS. 7A-7F. In FIG. 8B, a hard mask layer 480 is applied to the wafer (e.g. by oxidation) to define the corner cube reflectors during a subsequent alkaline wet etching (e.g., KOH etching) step, as shown in FIG. 8C.

Figure 8D:
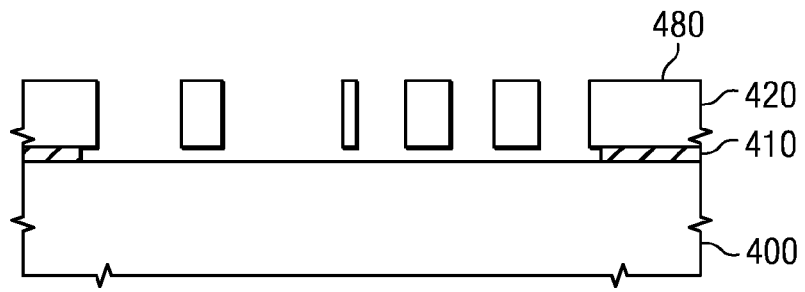
Figure 8E:
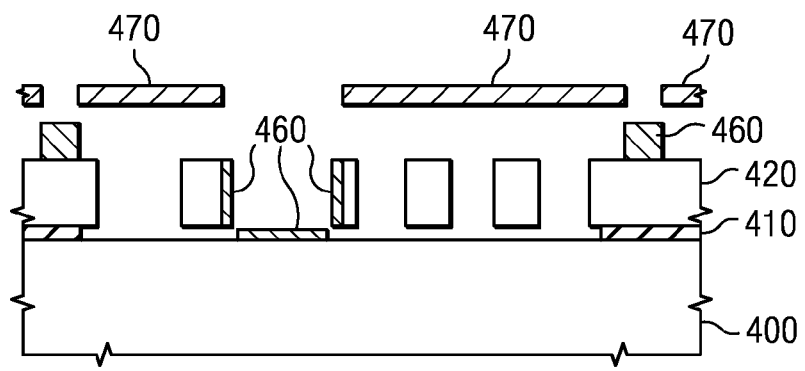

After the wet etching process shown in FIG. 8C, the large angled moving and fixed reflectors shown in FIGS. 6A and 6B are formed. Thereafter, as shown in FIG. 8D, moving structures, such as the actuator and moving reflectors are released by etching the buried SiO$_2$ layer 410 using HF, while fixed structures are not released due to the wider area of the SiO$_2$ beneath. In FIG. 8E, a shadow mask 470 is used for the selective metallization 460 of the moving and fixed mirrors, as well as for metallizing the substrate beneath the vertical corner cube edges to perform as the third edge of the corner cube reflector and creating connection pads. Although this fabrication process involves two etching steps, as well as extra steps for protection and lithography, it ensures the smoothness and verticality of the corner cube-like mirrors, which minimizes optical losses due to the multiple reflections that the beam will undergo during its propagation in the structure.

Figure 9A:
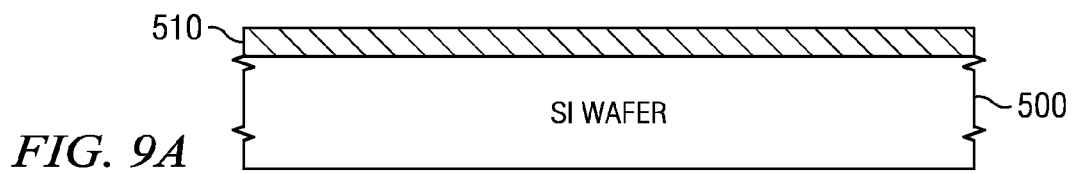
FIGS. 9A-9F illustrate exemplary fabrication process steps for fabricating a shadow mask for use in fabricating an optical MEMS device in accordance with embodiments of the present invention.
Figure 9B:

An exemplary process for creating the shadow mask is shown in FIGS. 9A-9F. As described above in connection with FIG. 7E and FIG. 8D, the shadow mask is used for the selective metallization of the wafer to ensure an adequate metallization for the minors, while at the same time protecting some surfaces from metallization. As shown in FIG. 9A, to create the shadow mask, first a metallic layer 510 is formed over a silicon wafer 500 using, for example, aluminum sputtering. Then, in FIG. 9B, a photo-resist material 520 and 530 is spun on both sides of the wafer 500. The top photo-resist material 520 is used for lithography, and the bottom photo-resist material 530 functions as an etch stop.

Figure 9C:
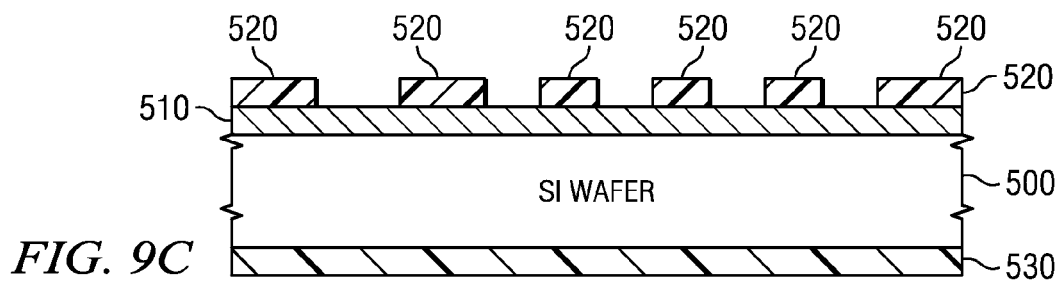
Figure 9D:
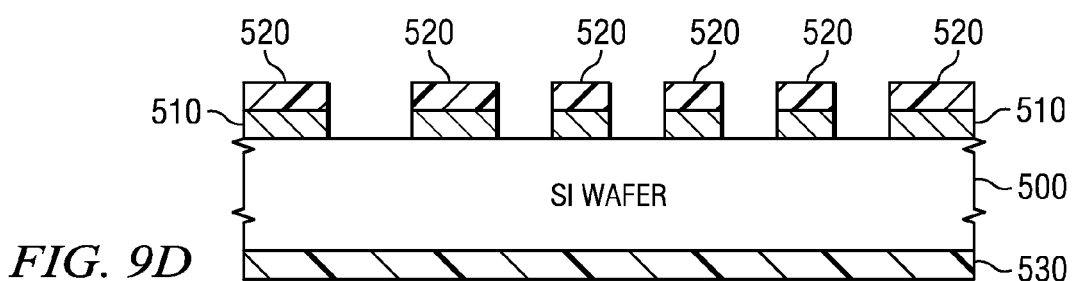
Figure 9E:
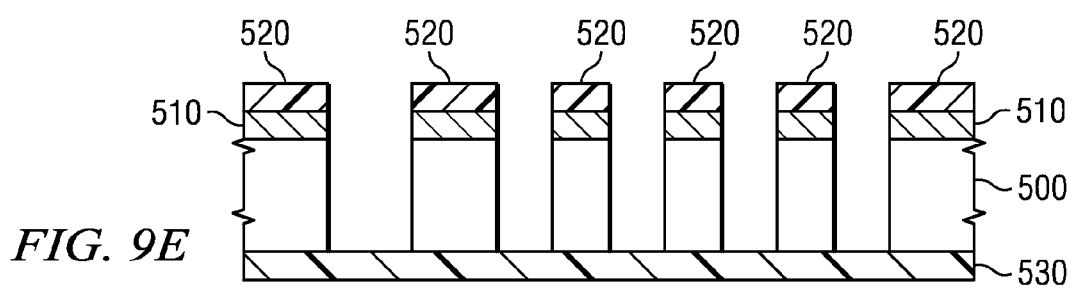
Figure 9F:
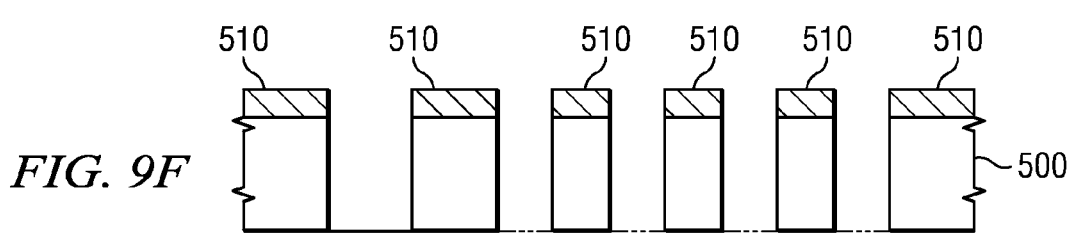

Subsequently, as shown in FIG. 9C, lithography is carried out on the top layer 520, followed by chlorine plasma etching of the aluminum layer 510, as shown in FIG. 9D. In FIG. 9E, using DRIE, etching through the silicon wafer 500 is performed until reaching the photo-resist material 530 on the bottom of the wafer 500. Finally, as shown in FIG. 9F, the photo-resist material 520 and 530 on the top and bottom of the wafer are removed to complete the shadow mask.

As will be recognized by those skilled in the art, the innovative concepts described in the present application can be modified and varied over a wide range of applications. Accordingly, the scope of patents subject matter should not be limited to any of the specific exemplary teachings discussed, but is instead defined by the following claims.

We claim:

1. An optical Micro Electro-Mechanical System (MEMS) device providing an optical path retardation multiplier, comprising:
    a substrate;
    an array of corner cube reflectors, a corner cube reflector of the array of corner cube reflectors including a first edge, a second edge and a third edge, the substrate acting as the third edge, the first and second edges being separated from the substrate by an air gap to enable movement of the first and second edges while the third edge remain stationary, the corner cube reflector being optically coupled to receive an incident beam on the first edge and operable to reflect the incident beam from the second edge;
    an array of fixed mirrors formed on the substrate, a fixed mirror of the array of fixed mirrors being optically coupled to receive the incident beam reflected from the corner cube reflector and operable to reflect the incident beam back towards the corner cube reflector as a reflected beam along a reverse path of the incident beam; and
    a MEMS actuator formed on the substrate and coupled to the array of corner cube reflectors to cause a displacement of the first and second edges of the corner cube reflector perpendicular to a plane of the fixed mirror to extend an optical path length of the reflected beam;
    wherein the array of fixed mirrors is offset from the array of corner cube reflectors such that the reflected beam is parallel to the incident beam.

2. The MEMS device of claim 1, wherein the fixed mirror is a flat mirror oriented orthogonal to a direction of the incident beam.

3. The MEMS device of claim 1, wherein an optical path difference between a first position of the array of corner cube reflectors and a second position of the array corner cube reflectors is equal to a displacement of the array of corner cube reflectors between the first position and the second position multiplied by a sum of four times a number of corner cube reflectors in the array of corner cube reflectors plus two.

4. The MEMS device of claim 1, wherein each fixed mirror in the array of fixed mirrors is a corner cube reflector coupled to receive the incident beam on one edge thereof from a first corresponding corner cube reflector in the array of corner cube reflectors and to reflect the reflected beam on another edge thereof towards a second corresponding corner cube reflector in the array of corner cube reflectors.

5. The MEMS device of claim 4, further comprising:
    a flat mirror coupled to an end of the array of corner cube reflectors and optically coupled to receive the incident beam from a last one of the corner cube reflectors in the array of fixed mirrors and to reflect the reflected beam back towards the last one of the corner cube reflectors in the array of fixed mirrors to direct the reflected beam along the reverse path.

6. The MEMS device of claim 5, further comprising:
a first small corner cube mirror coupled between the array of corner cube reflectors and the flat mirror; and
a second small corner cube mirror coupled to the array of fixed mirrors on an end thereof that is opposite to the end of the array of corner cube reflectors to which the flat mirror is coupled;
wherein respective dimensions each of the first and second small corner cube mirrors are smaller than respective dimensions of each corner cube reflector within the array of corner cube reflectors and each fixed mirror within the array of fixed mirrors.

7. The MEMS device of claim 6, wherein:
an optical path difference between a first position of the array of corner cube reflectors and a second position of the array corner cube reflector is increased by a factor equal to a number of circulations the incident beam travels through the array of corner cube reflectors and the array of fixed mirrors;
the number of circulations is based on the dimensions of the first and second small corner cube mirrors and a spot size of the incident beam.

8. The MEMS device of claim 1, wherein the MEMS device is a Fourier Transform spectrometer or Michelson interferometer and the array of fixed mirrors is a first array of fixed mirrors, and further comprising:
a second array of fixed mirrors;
a detector;
a beam splitter optically coupled to receive the incident beam and to split the incident beam into a first incident beam and a second incident beam, the first incident beam being directed towards an initial corner cube reflector of the array of corner cube reflectors to be reflected between a first side of the array of corner cube reflectors and the first array of fixed mirrors along a first forward and reverse path and output as a first reflected beam from the initial corner cube reflector of the array of corner cube reflectors;
an auxiliary mirror optically coupled to receive the second incident beam and to reflect the second incident beam towards an initial fixed mirror in the second array of fixed mirrors to be reflected between the second array of fixed mirrors and a second side of the array of corner cube reflectors along a second forward and reverse path and output as a second reflected beam from the initial fixed mirror of the second array of fixed mirrors;
wherein the auxiliary mirror further optically coupled to receive the second reflected beam and reflect the second reflected beam towards the beam splitter;
wherein the beam splitter is further optically coupled to receive the first reflected beam and combine the first reflected beam and the second reflected beam to produce a combined beam that is directed towards the detector.

9. The MEMS device of claim 8, wherein an optical path difference between a first position of the array of corner cube reflectors and a second position of the array corner cube reflector is equal to a displacement of the array of corner cube reflectors between the first position and the second position multiplied by twice a sum of four times a number of corner cube reflectors in the array of corner cube reflectors plus two.

10. The MEMS device of claim 1, wherein each corner cube reflector in the array of corner cube reflectors has an angle between 90 degrees and 120 degrees and each fixed mirror in the array of fixed mirrors has a corresponding angle.

11. The MEMS device of claim 10, wherein the angle is approximately 110 degrees.

12. The MEMS device of claim 10, wherein the array of fixed mirrors and the MEMS actuator are fabricated using a deep reactive ion etching process and the array of corner cube reflectors is fabricated using an anisotropic alkaline wet etching process.

13. The MEMS device of claim 1, further comprising:
an optical source for directing the incident beam towards an initial corner cube reflector in the array of corner cube reflectors.

14. The MEMS device of claim 1, wherein:
the first edge and the second edge are perpendicular to one another; and
the third edge is perpendicular to the first edge and the second edge.

15. The MEMS device of claim 1, wherein the incident beam is not parallel to a plane of the substrate.

16. The MEMS device of claim 1, wherein the incident beam is parallel to a plane of the substrate.

17. A Michelson interferometer fabricated as a Micro Electro-Mechanical System (MEMS) structure providing an optical path retardation multiplier, comprising:
first and second arrays of fixed mirrors;
a moveable array of corner cube reflectors moveable in an area between the first and second arrays of fixed mirrors in a direction orthogonal to a plane of the first and second arrays of fixed mirrors;
a detector;
a beam splitter optically coupled to receive an incident beam and to split the incident beam into a first incident beam and a second incident beam, the first incident beam being directed towards an initial corner cube reflector of the moveable array of corner cube reflectors to be reflected between a first side of the moveable array of corner cube reflectors and the first array of fixed mirrors along a first forward and reverse path and output as a first reflected beam from the initial corner cube reflector of the moveable array of corner cube reflectors;
an auxiliary mirror optically coupled to receive the second incident beam and to reflect the second incident beam towards an initial fixed mirror in the second array of fixed mirrors to be reflected between the second fixed array mirrors and a second side of the moveable array of corner cube reflectors along a second forward and reverse path and output as a second reflected beam from the initial fixed mirror of the second array of fixed mirrors;
wherein the auxiliary mirror further optically coupled to receive the second reflected beam and reflect the second reflected beam towards the beam splitter;
wherein the beam splitter is further optically coupled to receive the first reflected beam and combine the first reflected beam and the second reflected beam to produce a combined beam that is directed towards the detector.

18. The Michelson interferometer of claim 17, further comprising:
an optical source for directing the incident beam towards the beam splitter.

19. The Michelson interferometer of claim 17, wherein an optical path difference between a first position of the moveable array of corner cube reflectors and a second position of the moveable array corner cube reflector is equal to a displacement of the moveable array of corner cube reflectors between the first position and the second position multiplied by twice a sum of four times a number of corner cube reflectors in the moveable array of corner cube reflectors plus two.

20. The Michelson interferometer of claim 17, further comprising:
   a MEMS actuator coupled to the moveable array of corner cube reflectors to cause a displacement of the array of moveable corner cube reflectors.

* * * * *